(12) United States Patent
Huang

(10) Patent No.: US 11,750,293 B1
(45) Date of Patent: Sep. 5, 2023

(54) BUTTERFLY-TYPE PACKAGED OPTICAL TRANSCEIVER WITH MULTIPLE TRANSMISSION AND RECEPTION CHANNELS

(71) Applicant: SHUNYUN TECHNOLOGY (ZHONG SHAN) LIMITED, Zhongshan (CN)

(72) Inventor: Jie Huang, Zhongshan (CN)

(73) Assignee: SHUNYUN TECHNOLOGY (ZHONG SHAN) LIMITED, Zhongshan (CN)

( * ) Notice: Subject to any disclaimer, the term of this patent is extended or adjusted under 35 U.S.C. 154(b) by 0 days.

(21) Appl. No.: 17/731,536

(22) Filed: Apr. 28, 2022

(30) Foreign Application Priority Data

Apr. 21, 2022 (CN) .......................... 202210424991.0

(51) Int. Cl.
*H04B 10/00* (2013.01)
*H04B 10/40* (2013.01)
*G02B 6/42* (2006.01)

(52) U.S. Cl.
CPC ........... *H04B 10/40* (2013.01); *G02B 6/4213* (2013.01); *G02B 6/4246* (2013.01); *G02B 6/4265* (2013.01)

(58) Field of Classification Search
CPC ...... G02B 6/4265; G02B 6/27; G02B 6/4213; G02B 6/4246; H04B 10/40; H04B 10/25
See application file for complete search history.

(56) References Cited

U.S. PATENT DOCUMENTS

| | | | | |
|---|---|---|---|---|
| 4,244,045 A | * | 1/1981 | Nosu | H04J 14/02 398/91 |
| 6,493,121 B1 | * | 12/2002 | Althaus | G02B 6/4246 398/139 |
| 6,563,976 B1 | * | 5/2003 | Grann | G02B 6/29367 385/47 |
| 6,571,033 B2 | * | 5/2003 | Caracci | G02B 6/4246 385/47 |
| 7,013,069 B1 | * | 3/2006 | He | G02B 6/4246 385/47 |

(Continued)

FOREIGN PATENT DOCUMENTS

| | | |
|---|---|---|
| CN | 202735549 U | 2/2013 |
| CN | 104459904 A | 3/2015 |

(Continued)

*Primary Examiner* — Agustin Bello
(74) *Attorney, Agent, or Firm* — ScienBiziP, P.C.

(57) ABSTRACT

A butterfly-type packaged optical transceiver with multiple transmission and reception channels includes a box-shaped housing, a cover plate, an optical receiving module, an optical emitting module, a polarizing prism module, an optical fiber connector and electrical connection elements. The sealed housing encloses the optical receiving module, the optical emitting module, and the polarizing prism module. Electrical connection elements penetrate both side surfaces of the housing and are in contact with the optical fiber connector and the optical receiving module and the optical emitting module. A first incoming optical signal is transmitted to the optical receiving module via the optical fiber connector, the through hole, and the prism module, and the optical emitting module emits an outgoing second optical signal through the prism module, the through hole, and the optical fiber connector.

17 Claims, 4 Drawing Sheets

(56) References Cited

U.S. PATENT DOCUMENTS

| | | | | |
|---|---|---|---|---|
| 7,070,340 B2* | 7/2006 | Crane, Jr. | G02B 6/4277 | 385/92 |
| 7,218,451 B2* | 5/2007 | Lee | G02B 6/2938 | 359/489.07 |
| 7,258,494 B2* | 8/2007 | Park | G02B 6/4214 | 385/47 |
| 7,366,371 B1* | 4/2008 | Wen | G02B 6/4246 | 385/24 |
| 7,450,858 B2* | 11/2008 | Verdiell | H01S 5/4087 | 398/164 |
| 7,502,176 B2* | 3/2009 | Mino | G02B 19/0057 | 372/9 |
| 7,661,889 B2* | 2/2010 | Zhu | G02B 6/29362 | 398/79 |
| 7,773,655 B2* | 8/2010 | Chuyanov | H01S 5/405 | 372/50.23 |
| 7,933,521 B2* | 4/2011 | Wen | G02B 6/4246 | 398/91 |
| 8,160,451 B2* | 4/2012 | Liu | G02B 6/4246 | 398/139 |
| 8,320,763 B2* | 11/2012 | Kim | H01S 5/0612 | 398/68 |
| 8,427,749 B2* | 4/2013 | Du | H01S 5/02326 | 359/627 |
| 8,437,086 B2* | 5/2013 | Du | H01S 5/405 | 359/629 |
| 8,641,298 B2* | 2/2014 | Lim | G02B 6/4246 | 385/14 |
| 8,818,193 B2* | 8/2014 | Chen | G02B 6/29395 | 398/198 |
| 8,842,705 B2* | 9/2014 | Janssens | G02B 19/0057 | 372/36 |
| 8,939,656 B2* | 1/2015 | Takahashi | G02B 6/4215 | 385/92 |
| 9,008,474 B2* | 4/2015 | Nakanishi | G02B 6/4246 | 385/33 |
| 9,020,308 B2* | 4/2015 | Lim | G02B 6/3628 | 385/16 |
| 9,042,731 B2* | 5/2015 | Kurokawa | G02B 6/4213 | 398/91 |
| 9,209,605 B1* | 12/2015 | Guo | H01S 5/4068 | |
| 9,214,786 B2* | 12/2015 | Hemenway | H01S 5/146 | |
| 9,243,761 B2* | 1/2016 | Nakanishi | H01S 5/02253 | |
| 9,244,235 B2* | 1/2016 | Norton | G02B 6/32 | |
| 9,250,401 B2* | 2/2016 | Lim | G02B 6/4215 | |
| 9,318,876 B1* | 4/2016 | Li | H01S 5/125 | |
| 9,377,612 B2* | 6/2016 | Govorkov | H01S 5/4012 | |
| 9,459,416 B2* | 10/2016 | Satake | G02B 6/4256 | |
| 9,490,900 B2* | 11/2016 | Saeki | G02B 6/4257 | |
| 9,632,260 B2* | 4/2017 | Mizobuchi | G02B 6/4215 | |
| 9,705,289 B2* | 7/2017 | Kanskar | G02B 27/30 | |
| 9,720,179 B2* | 8/2017 | Amit | G02B 27/1006 | |
| 9,753,223 B2* | 9/2017 | Yang | G02B 6/29365 | |
| 9,780,882 B2* | 10/2017 | Saeki | G02B 6/32 | |
| 9,784,919 B2* | 10/2017 | Wang | G02B 6/4263 | |
| 9,910,233 B2* | 3/2018 | Tamura | G02B 6/43 | |
| 9,977,200 B2* | 5/2018 | Lin | G02B 6/29362 | |
| 10,018,787 B1* | 7/2018 | Wang | G02B 6/3845 | |
| 10,044,445 B2* | 8/2018 | Ho | H04B 10/40 | |
| 10,054,762 B2* | 8/2018 | Lin | H04B 10/66 | |
| 10,090,934 B2* | 10/2018 | Hara | G02B 6/2938 | |
| 10,151,893 B2* | 12/2018 | Nakanishi | H01S 5/4093 | |
| 10,153,608 B2* | 12/2018 | Hemenway | H01S 5/02251 | |
| 10,170,892 B2* | 1/2019 | Yanase | G02B 27/0905 | |
| 10,185,104 B2* | 1/2019 | Fujimura | G02B 6/4225 | |
| 10,203,455 B2* | 2/2019 | Amit | H04B 10/506 | |
| 10,203,458 B2* | 2/2019 | Yamaji | G02B 27/141 | |
| 10,261,261 B2* | 4/2019 | Hemenway | G02B 19/0057 | |
| 10,283,939 B2* | 5/2019 | Dawson | H01S 5/02251 | |
| 10,386,579 B2* | 8/2019 | Saeki | G02B 6/4201 | |
| 10,422,956 B2* | 9/2019 | Tokutaka | G02F 1/035 | |
| 10,432,339 B2* | 10/2019 | Kawamura | G02B 6/4244 | |
| 10,514,510 B2* | 12/2019 | Lin | G02B 5/26 | |
| 10,601,200 B2* | 3/2020 | Enya | H01S 5/4012 | |
| 10,763,640 B2* | 9/2020 | Kanskar | H01S 5/4012 | |
| 10,795,170 B2* | 10/2020 | Du | G02B 27/1006 | |
| 10,801,697 B2* | 10/2020 | Dattner | F21V 23/0457 | |
| 10,855,056 B2* | 12/2020 | Chen | H01S 5/02251 | |
| 11,152,762 B2* | 10/2021 | Kaji | H01S 5/0235 | |
| 11,204,507 B2* | 12/2021 | Hara | G02B 5/3083 | |
| 11,347,126 B2* | 5/2022 | Saeki | G02F 1/2257 | |
| 11,405,108 B2* | 8/2022 | Shin | H04J 14/0202 | |
| 11,411,651 B2* | 8/2022 | Huh | H05K 9/0081 | |
| 11,552,443 B1* | 1/2023 | Gamache | H01S 3/005 | |
| 2002/0051360 A1* | 5/2002 | Solodovnikov | G02B 27/09 | 362/244 |
| 2002/0081073 A1* | 6/2002 | Lee | G02B 6/29395 | 385/47 |
| 2003/0063844 A1* | 4/2003 | Caracci | G02B 6/32 | 385/24 |
| 2003/0076559 A1* | 4/2003 | Richard | G02B 6/2938 | 370/535 |
| 2004/0252388 A1* | 12/2004 | Yamanaka | G02B 27/0905 | 359/834 |
| 2005/0276612 A1* | 12/2005 | Wawro | G02B 6/4257 | 398/164 |
| 2006/0018204 A1* | 1/2006 | Lee | G02B 6/4246 | 369/13.29 |
| 2006/0274434 A1* | 12/2006 | Mino | G02B 6/4214 | 359/811 |
| 2008/0292317 A1* | 11/2008 | Wen | G02B 6/29367 | 398/79 |
| 2009/0310920 A1* | 12/2009 | Kim | G02B 6/4214 | 385/88 |
| 2009/0323752 A1* | 12/2009 | Chuyanov | G02B 19/0052 | 372/50.23 |
| 2010/0119231 A1* | 5/2010 | Kim | G02B 6/1221 | 372/92 |
| 2011/0076023 A1* | 3/2011 | Chen | G02B 6/29395 | 398/119 |
| 2012/0002293 A1* | 1/2012 | Du | H01S 5/02326 | 359/629 |
| 2012/0002395 A1* | 1/2012 | Du | H01S 5/4012 | 362/241 |
| 2012/0128300 A1* | 5/2012 | Ban | G02B 6/421 | 385/33 |
| 2012/0148192 A1* | 6/2012 | Nakanishi | G02B 6/4206 | 385/33 |
| 2012/0189306 A1* | 7/2012 | Du | H01S 5/02251 | 398/65 |
| 2013/0051024 A1* | 2/2013 | Amit | H04B 10/40 | 29/428 |
| 2013/0108262 A1* | 5/2013 | Lim | G02B 6/4215 | 398/43 |
| 2013/0148966 A1* | 6/2013 | Kurokawa | H04J 14/06 | 398/65 |
| 2013/0287406 A1* | 10/2013 | Huang | G02B 6/4214 | 398/139 |
| 2015/0078761 A1* | 3/2015 | Yamaji | G02B 6/4265 | 398/182 |
| 2015/0104177 A1* | 4/2015 | Kato | H04B 10/40 | 398/79 |
| 2015/0295386 A1* | 10/2015 | Hemenway | H01S 5/4012 | 372/46.01 |
| 2015/0326319 A1* | 11/2015 | Oki | H04B 10/40 | 398/135 |
| 2015/0333833 A1* | 11/2015 | Saeki | G02B 6/4206 | 398/79 |
| 2015/0346433 A1* | 12/2015 | Tamura | H04B 10/506 | 398/82 |
| 2016/0028489 A1* | 1/2016 | Saeki | G02B 6/4214 | 398/79 |
| 2016/0047987 A1* | 2/2016 | Du | G02B 6/2773 | 359/484.05 |
| 2016/0131843 A1* | 5/2016 | Amit | G02B 6/2938 | 156/60 |
| 2016/0142145 A1* | 5/2016 | Yang | H04B 10/506 | 398/135 |

(56) References Cited

U.S. PATENT DOCUMENTS

| | | | |
|---|---|---|---|
| 2016/0147017 A1* | 5/2016 | Tamura | G02B 6/43 |
| | | | 385/24 |
| 2016/0170146 A1* | 6/2016 | Kurokawa | G02B 6/425 |
| | | | 385/14 |
| 2017/0038541 A1* | 2/2017 | Fujimura | G02B 6/4225 |
| 2017/0063465 A1* | 3/2017 | Lin | H01S 5/4012 |
| 2017/0075079 A1* | 3/2017 | Lin | H01S 5/0078 |
| 2017/0184802 A1* | 6/2017 | Saeki | G02B 6/4206 |
| 2017/0227724 A1* | 8/2017 | Yamaji | H04B 10/505 |
| 2017/0229839 A1* | 8/2017 | Yamaji | G02B 6/4244 |
| 2017/0242206 A1* | 8/2017 | Chen | G02B 6/00 |
| 2017/0322381 A1* | 11/2017 | Saeki | G02B 6/4201 |
| 2018/0019568 A1* | 1/2018 | Kyono | G02B 6/4244 |
| 2018/0024303 A1* | 1/2018 | Nakanishi | G02B 6/4251 |
| | | | 385/33 |
| 2018/0059340 A1* | 3/2018 | Lin | G02B 6/29395 |
| 2018/0145789 A1* | 5/2018 | Iwasaki | H04B 10/506 |
| 2018/0164515 A1* | 6/2018 | Amit | G02B 27/1006 |
| 2018/0335589 A1 | 11/2018 | Jou et al. | |
| 2020/0012055 A1* | 1/2020 | Ye | H04J 14/0256 |
| 2020/0044738 A1* | 2/2020 | Leigh | H04J 14/0216 |
| 2020/0158312 A1* | 5/2020 | Dattner | G02B 27/141 |
| 2021/0072445 A1* | 3/2021 | Kurokawa | G02B 6/4213 |
| 2021/0320719 A1* | 10/2021 | Nagashima | H04B 10/40 |
| 2022/0014272 A1* | 1/2022 | Shin | H04B 10/25891 |
| 2022/0271843 A1* | 8/2022 | Mii | G02B 6/4208 |
| 2022/0333745 A1* | 10/2022 | Goutain | H01S 5/02326 |
| 2023/0110986 A1* | 4/2023 | Uyeno | H04B 10/2569 |
| | | | 398/115 |

FOREIGN PATENT DOCUMENTS

| | | |
|---|---|---|
| CN | 104678515 A | 6/2015 |
| CN | 108732684 A | 11/2018 |
| CN | 108957649 A | 12/2018 |
| CN | 110417476 A | 11/2019 |
| CN | 112787220 A | 5/2021 |
| WO | 2018170828 A1 | 9/2018 |

* cited by examiner

BUTTERFLY-TYPE PACKAGED OPTICAL TRANSCEIVER WITH MULTIPLE TRANSMISSION AND RECEPTION CHANNELS

FIELD

The subject matter herein generally relates to butterfly-type packaged optical transceivers.

BACKGROUND

Optical communications have low transmission loss, high data confidentiality, immunity from electromagnetic interference (EMI), and large bandwidth. Optical transceivers, which convert optical signals into electrical signals for transmission, and convert electrical signals into optical signals for transmission through an optical fiber network, are important basic components for optical communication.

However, conventional butterfly-type packaged optical components only have a single transmit channel or receive channel. Each optical component needs to be mounted individually on electrical elements, with gold wire bonding, hermetic sealing, and optically coupling, which limits the amount of optical transmission and increases the complexity of assembly process, affecting the product yield.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. It will be appreciated that for simplicity and clarity of illustration, where appropriate, reference numerals have been repeated among the different figures to indicate corresponding or analogous elements.

DETAILED DESCRIPTION

Figure 1:
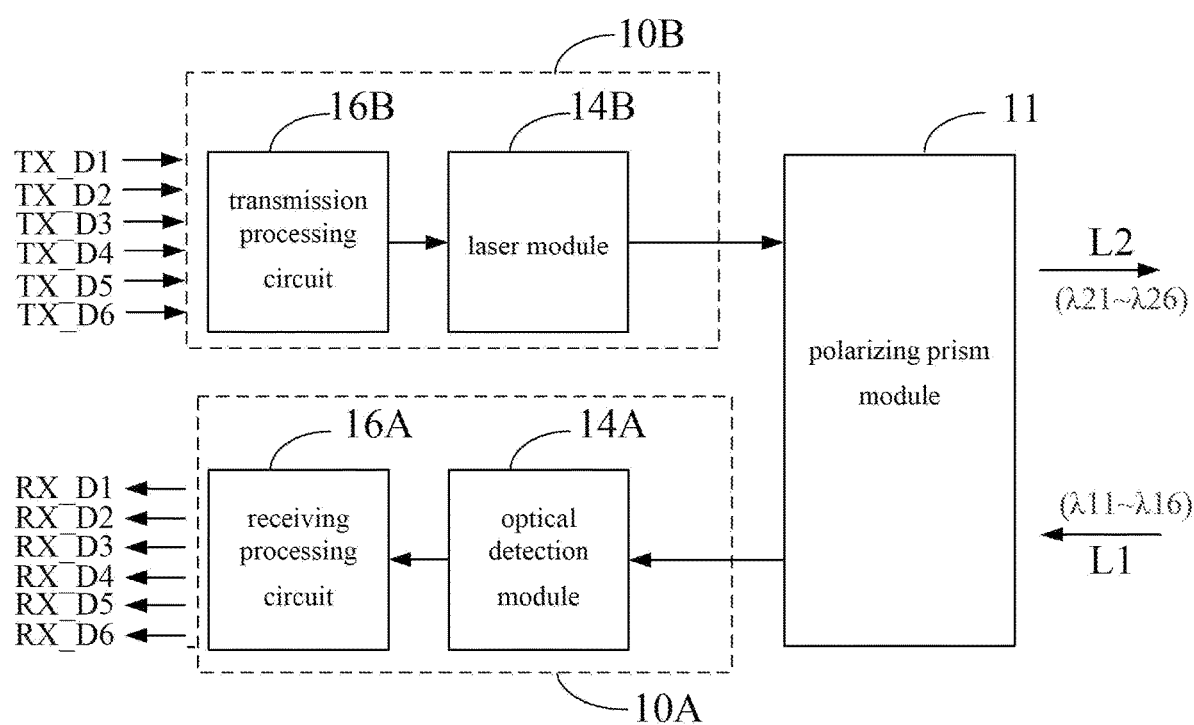
FIG. 1 is a schematic block diagram of an optical transceiver device according to an embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one".

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 shows an optical transceiver device (optical transceiver device 100) according to an embodiment of the disclosure. As shown in FIG. 1, the optical transceiver device 100 comprises an optical receiving module 10A and an optical emitting module 10B. The optical receiving module 10A comprises an optical detection module 14A and a receiving processing circuit 16A. The optical emitting module 10B comprises a laser module 14B and a transmission processing circuit 16B. In this embodiment, the optical transceiver device 100 is coupled to an optical fiber cable via an optical fiber connector (not shown). The optical fiber connector can be a straight tip (ST) type, square connector (SC) type, ferrule connector (FC) type, and little connector (LC) type.

Dense wavelength division multiplexing (DWDM) is a fiber-optic transmission technique. It multiplexes many different wavelength signals onto a single optical fiber. Each optical fiber has a set of parallel optical channels and each one uses slightly different wavelength of light. The optical fibers employ certain light wavelengths to transmit data parallel-by-bit or serial-by-character. An embodiment of this disclosure involves the DWDM technology. The optical transceiver device 100 can receive or transmit optical signals in different wavelengths. Therefore, the optical signal L1 received by the optical fiber connector can have six wavelengths, such as $\lambda11$-$\lambda16$, and the transmitted optical signal L2 can have six wavelengths, such as $\lambda21$-$\lambda26$. The numbers of the laser diodes of the laser module 14B and that of the optical detectors of the optical detection module 14A are also arranged to correspond to the number of channels. Although the embodiment uses a six-channel configuration as an example, the actual number is not limited to these, and there may be 2, 4, 8, 16, 32, etc. channels.

The polarizing prism module 11 can transmit optical signals with wavelengths within a specific range and reflect optical signals with wavelengths within another specific range. The optical signal L1 is transmitted to the polarizing prism module 11. According to an embodiment of the disclosure, the polarizing prism module 11 uses an Arrayed Waveguide Grating (AWG) technology to differentiate the optical signal L1 into sub-optical signals corresponding to the six wavelengths $\lambda11$-$\lambda16$. The optical detection module 14A detects the six sub-optical signals and generates corresponding electrical signals. According to an embodiment of the disclosure, the optical detection module 14A may include P-doped-intrinsic-doped-N (PIN) diodes or avalanche photodiodes (APD). The electrical signals are processed by the amplifying circuit (such as a trans-impedance amplifier (TIA)) and the conversion circuit of the receiving processing circuit 16A, and then the data (RX_D1~RX_D6)

transmitted by the optical signal L1 can be obtained and processed. According to other embodiments of the disclosure, the polarizing prism module 11 may also use related technologies such as a thin-film filter (TFF) or a Fiber Bragg Grating (FBG) to convert the optical signal L1 into different wavelengths of light.

The transmission processing circuit 16B receives and converts the electrical data signals (TX_D1~TX_D6), and outputs the converted signals to the laser module 14B. The laser module 14B modulates the received electrical data signals into sub-optical signals. In the embodiment of the disclosure, the laser module 14B can be Vertical-Cavity Surface-Emitting laser diodes (hereinafter referred to as VCSELs). The VCSELs form an array to emit optical signals. In other embodiments, the laser module 14B can be light-emitting diodes (LED), edge emitting laser diodes (EELD), distributed feedback laser diodes (DFB), or electro-absorption modulated laser diodes (EML).

The polarizing prism module 11 converts the modulated sub-optical signals corresponding to the electrical data signals (TX_D1~TX_D6) into an optical signal L2 including six wavelengths of λ21-λ26, and transmits the optical signal L2 to the optical fiber connector through the polarizing prism module 11. According to an embodiment of the disclosure, the optical receiving module 10A and the optical emitting module 10B further include other functional circuit elements, such as a laser driver and an automatic power controller (APC) for driving the laser module 14B, a monitor photodiode (MPD) to monitor the power of the laser module 14B, circuit elements necessary to implement the optical signal transmission, and the digital signal processing integrated circuit for processing the electrical signals from the optical receiving module 10A. Such elements are well known to those skilled in the art, and will not be repeated here.

Figure 2:
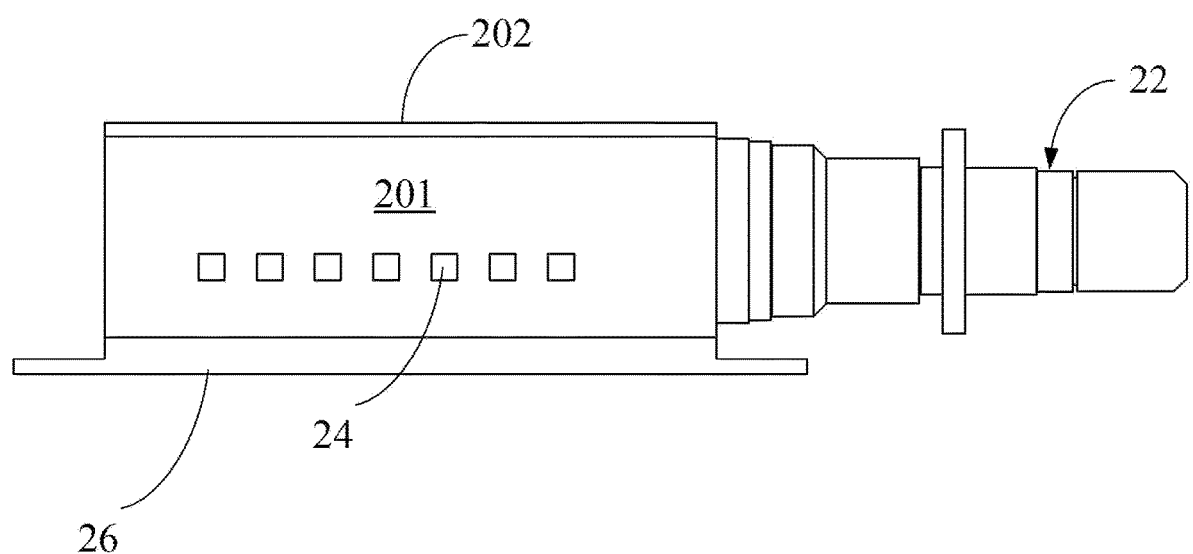
FIG. 2 is a side view of a butterfly-type packaged optical transceiver according to an embodiment of the disclosure.

FIG. 2 shows a side view of a butterfly-type packaged optical transceiver according to an embodiment of the disclosure. The butterfly-type packaged optical transceiver according to an embodiment of the disclosure comprises a box-shaped housing 201, a cover plate 202, an optical fiber connector 22, and electrical connection elements 24. The box-shaped housing 201 is a housing with five fixed surfaces and the removable cover plate 202 forms the sixth surface. By assembling the cover plate 202 to the box-shaped housing 201, a hermetically sealed container is formed. The internal space formed by the box-shaped housing 201 and the cover plate 202 is used for arranging electrical elements. The box-shaped housing 201 and the cover plate 202 can be made of metal. According to an embodiment of the disclosure, the material of the box-shaped housing 201 and the cover plate 202 is Kovar alloy.

For the convenience of description, the disclosure takes the box-shaped housing 201, a rectangular parallelepiped, as an example. The specific shape of the box-shaped housing 201 is not limited. Those skilled in the art can select a box-shaped housing with a specific shape as required. In addition, the disclosure stipulates that the box-shaped housing 201 is hermetically sealed by the cover plate 202, surfaces within the sealed space are defined as inner or interior surfaces, and the surfaces that can be seen from the outside are defined as outer or exterior surfaces. The side opposite to the cover plate 202 is defined as the bottom surface, the cover plate 202 is defined as the top surface, and the four surfaces surrounding the bottom surface are defined as the side surfaces.

There is a through hole for optical signals to pass the optical fiber connector 22 on one side of the box-shaped housing 201. According to an embodiment of the disclosure, the optical fiber connector can be in the form of straight tip (ST) type, square connector (SC) type, ferrule connector (FC) type, and little connector (LC) type. There are electrical connection elements 24 which penetrate both side surfaces adjoining the surface of the box-shaped housing in contact with the optical fiber connector 22 and are electrically connected to the components in the internal space formed by the box-shaped housing 201 and the cover plate 202. The bottom surface of the box-shaped housing 201 is disposed on a base 26.

Figure 3:
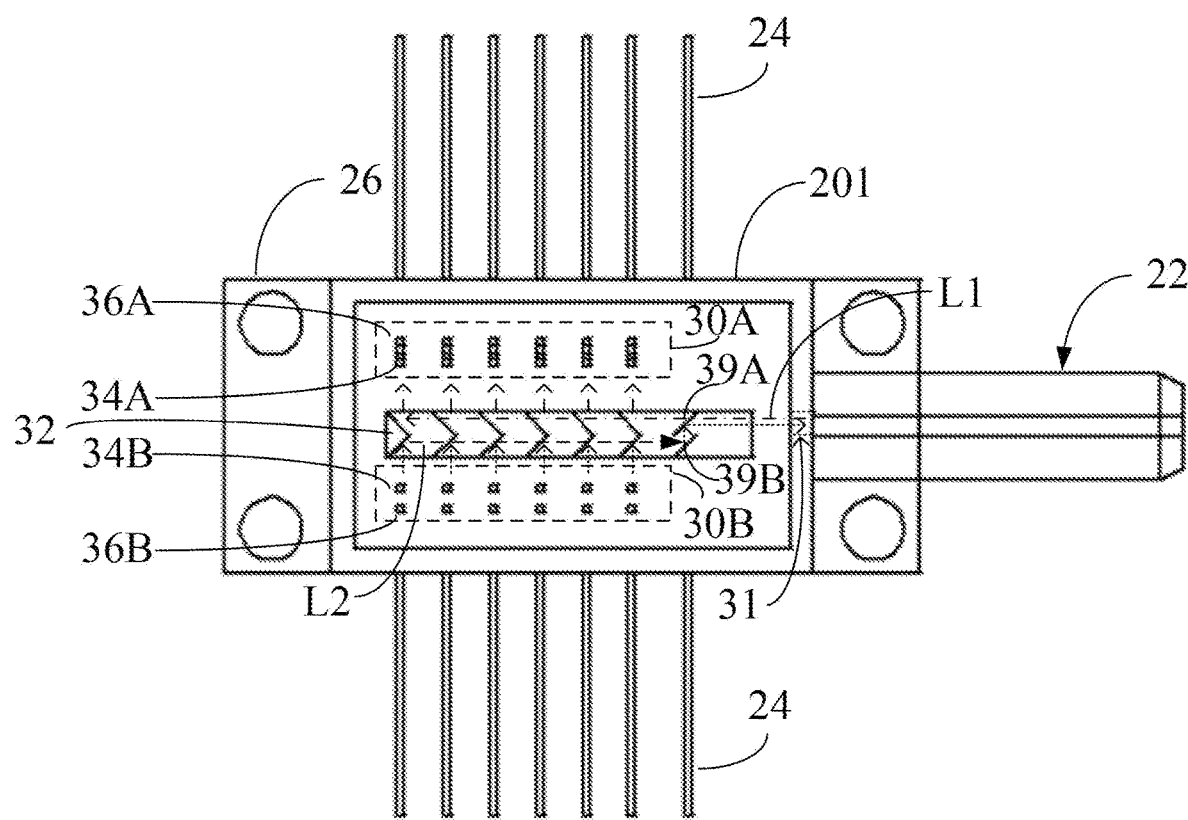
FIG. 3 is a top view of the butterfly-type packaged optical transceiver shown in FIG. 2 according to an embodiment of the disclosure.

FIG. 3 shows a top view of a butterfly-type packaged optical transceiver according to an embodiment of the disclosure. For the convenience of description, FIG. 3 does not show the cover plate 202, and labels of optical paths are added. A through hole 31 is provided on the side of the box-shaped housing 201 that is connected to the optical fiber connector 22 for allowing optical signals to pass through. There are electrical connection elements 24 penetrating both side surfaces adjoining the side of the box-shaped housing 201 that is connected to the optical fiber connector 22. The optical receiving module 30A is disposed in the internal space formed by the cover plate 202 and the box-shaped housing 201. The optical receiving module 30A comprises optical detectors 34A and receiving processing circuits 36A. According to an embodiment of the disclosure, the optical detectors 34A and the receiving processing circuits 36A are mounted on a base, the base is directly mounted on the inner surface of the box-shaped housing 201, and the electronic elements are connected with components by gold wire bonding.

According to an embodiment of the disclosure, the optical detectors 34A may include P-doped-intrinsic-doped-N (PIN) diodes or avalanche photodiodes (APD). The number of optical detectors 34A can be configured according to the number of optical channels. In this embodiment, the configuration of six channels is used as an example, so the number of photodetectors 34A is six, which respectively detect the sub-optical signals of six wavelengths of 1491 nm, 1511 nm, 1531 nm, 1551 nm, 1571 nm, and 1591 nm, and generate corresponding electric signals. The electrical signals are processed by the amplifying circuit (such as a trans-impedance amplifier (TIA)) and the conversion circuit of the receiving processing circuit 36A, and then the data transmitted by the optical signal L1 can be obtained.

The optical emitting module 30B is disposed in the internal space formed by the cover plate 202 and the box-shaped housing 201. The optical emitting module 30B comprises laser diodes 34B and transmission processing circuits 36B. According to an embodiment, laser diodes 34B and transmission processing circuits 36B are directly mounted on the inner surface of the box-shaped housing 201, and are connected with components by gold wire bonding. In other embodiments, the laser diodes 34B and transmission processing circuits 36B can be mounted on a base, and the base is directly mounted on the inner surface of the box-shaped housing 201. The transmission processing circuits 36B convert and transmit the received electrical data signals to the laser diodes 34B, and the laser diodes 34B modulate the received electrical data signals into sub-optical signals. In the embodiment of the disclosure, the laser diodes 34B can be VCSELs, light-emitting diodes (LED), edge emitting laser diodes (EELD), distributed feedback laser diodes (DFB) or electro-absorption modulated laser diodes (EML). Similarly, the number of the laser diodes 34B can be configured according to the number of optical channels. In this embodiment, the configuration of six channels is used as an example, so the number of laser diodes 34B is six, and the sub-optical signals of six wavelengths of 1271 nm, 1291 nm, 1311 nm, 1331 nm, 1351 nm, and 1371 nm are respectively emitted.

The polarizing prism module 32 and the polarizer module are disposed in the internal space formed by the cover plate 202 and the box-shaped housing 201, and are disposed between the optical receiving module 30A and the optical emitting module 30B. The polarizing prism module 32 and the polarizer module transmit optical signals with wavelengths within a specific range and reflect optical signals with wavelengths of another specific range. According to an embodiment of the disclosure, the optical signal L1 penetrating the optical fiber connector 22 and the through hole 31 comprises six wavelengths of 1491 nm, 1511 nm, 1531 nm, 1551 nm, 1571 nm, and 1591 nm, while the optical signal L2 transmitted to the optical fiber connector 22 comprises six wavelengths of 1271 nm, 1291 nm, 1311 nm, 1331 nm, 1351 nm, and 1371 nm. According to other embodiments of the disclosure, the polarizing prism module 32 may be integrally formed with the polarizer module.

The polarizer module comprises polarizers 39A and 39B for adjusting the direction of the optical signal L2 to align with the optical fiber connector 22. According to the embodiment of the disclosure, the polarizer 39A and the polarizer 39B are collinear, and the extension line formed by the polarizer 39A and the polarizer 39B is orthogonal to the axis formed by the polarizing prism module 32, the through hole 31, and the optical fiber connector 22. The polarizer 39A allows all sub-optical signals in the optical signal L1 to pass through. The polarizing prism module 32 uses the Arrayed Waveguide Grating (AWG) technology to differentiate the optical signal L1 into sub-optical signals corresponding to six wavelengths of 1491 nm, 1511 nm, 1531 nm, 1551 nm, 1571 nm, and 1591 nm, and reflect them to the corresponding optical detectors 34A. As shown in FIG. 3, the optical signal L1 is transmitted to the polarizing prism module 32 through the polarizer 39A along the direction parallel to the axis formed by the polarizing prism module 32, the through hole 31, and the optical fiber connector 22. The sub-optical signals differentiated from the optical signal L1 are transmitted to the corresponding optical detectors 34A in a direction perpendicular to the axis.

The six laser diodes 34B transmit sub-optical signals of different wavelengths comprising wavelengths of 1271 nm, 1291 nm, 1311 nm, 1331 nm, 1351 nm, and 1371 nm to the polarizing prism module 32 in a direction perpendicular to the axis formed by the polarizing prism module 32, the through hole 31, and the optical fiber connector 22. The polarizing prism module 32 uses the arrayed waveguide grating (AWG) technology to combine the sub-optical signals of different wavelengths into the optical signal L2, and transmits the combined optical signal L2 in a direction parallel to the axis formed by the polarizing prism module 32, the through hole 31, and the optical fiber connector 22. The polarizer 39B forms an included angle of 45 degrees with the axis, and reflects all the sub-optical signals in the optical signal L2. Thus, the optical signal L2 is transmitted to the polarizer 39A in a direction perpendicular to the axis. Similarly, the polarizer 39A is 45 degrees from the axis direction and reflects all the sub-optical signals in the optical signal L2, so that the optical signal L2 is transmitted to the through hole 31 in a direction parallel to the axis to transmit to the optical fiber connector 22.

According to the embodiment of the disclosure, the optical receiving module 30A and the optical emitting module 30B further comprise other functional circuit elements, such as a laser driver and an automatic power controller (APC) for driving the laser diodes 34B, a monitor photodiode (MPD) to monitor the power of the laser diodes 34B, circuit elements necessary to implement the optical signal transmission, and the digital signal processing integrated circuit for processing the electrical signals from the optical receiving module 30A and, similarly for those to be transmitted to the optical emitting module 30B, well known to those skilled in the art.

Figure 4:
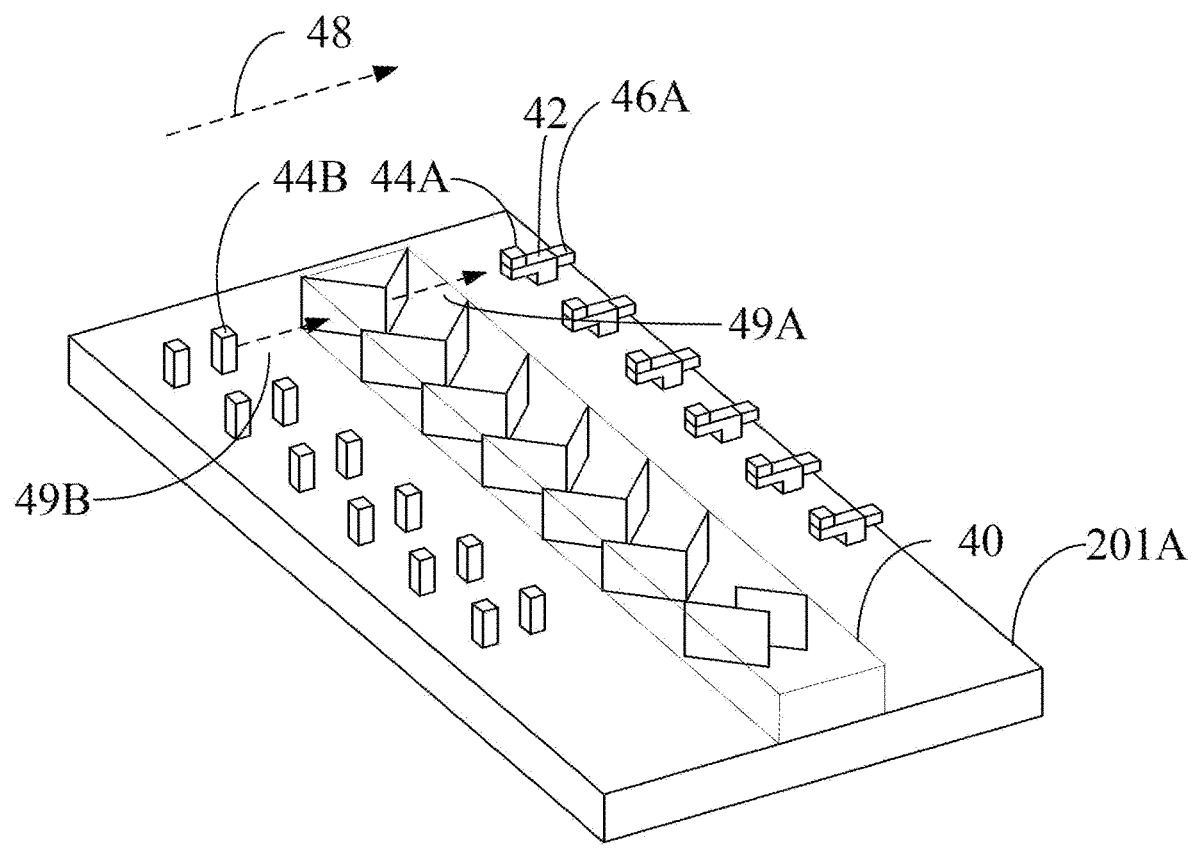
FIG. 4 is a schematic diagram of an optical receiving module, an optical emitting module, a polarizing prism module, and a polarizer module according to an embodiment of the disclosure.

FIG. 4 shows the relationship of the optical receiving module, the optical emitting module, the polarizing prism module, and the polarizer module according to an embodiment of the disclosure. In FIG. 4, the polarizing prism module and the polarizer module have been integrated into a single optical device 40. The optical detector 44A and the receiving processing circuits 46A of the optical receiving module are mounted on the base 42, and the light receiving surface of the optical detector 44A faces the optical device 40 to receive the sub-light signal. According to an embodiment of the disclosure, the function of the base 42 is to adjust the position of the light receiving surface of the optical detector 44A to receive the sub-light signal. The shape and size of the base 42 can be adjusted according to actual needs. The laser diode 44B and the optical detector 44A are arranged on both sides of the optical device 40 in a one-to-one correspondence, wherein the optical detector 44A receives the sub-optical signal 49A from the optical device 40 along a predetermined direction 48, and the laser diode 44B transmits sub-optical signal 49B toward the optical device 40 along the predetermined direction 48.

According to the butterfly-type packaged optical transceiver provided by the embodiment of the disclosure, the laser diodes and optical detectors of different wavelengths are integrated in a single butterfly-type package. Compared with conventional butterfly-type packaged optical components, which only have a single transmission channel or single receiving channel, the number of components of the butterfly-type package is effectively reduced, and the extent of hermetic packaging and sealing and the number of optical couplings is reduced, decreasing the complexity of the assembly process and improving the product yield.

Many details are often found in the relevant art and many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A butterfly-type packaged optical transceiver comprising:
   a box-shaped housing having a through hole;
   a cover plate coupled with the box-shaped housing, and forming an internal space with the box-shaped housing;
   an optical receiving module disposed in the internal space, and comprising a plurality of optical detectors;
   an optical emitting module disposed in the internal space, and comprising a plurality of laser diodes;
   a prism filter module disposed in the internal space and between the optical detectors and the laser diodes, and extending in an axis, wherein the prism filter module comprising a plurality of prism filters arranged along the axis, and each of the prism filters is between one of the optical detectors and one of the laser diodes in a direction perpendicular to the axis, wherein centers of the prism filter module and the through hole define an axis;

an optical fiber connector connected to the through hole; and a plurality of electrical connection elements respectively penetrating both side surfaces and electrically connected to the optical receiving module and the optical emitting module, wherein the side surfaces are adjoining a surface of the box-shaped housing contacting with the optical fiber connector, wherein a first optical signal comprising a plurality of sub-optical signals is transmitted to the prism filter module via the optical fiber connector and the through hole, and each of prism filters reflects one of the first sub-optical signal to one of the optical detectors, and wherein each of the laser diodes emits a second sub-optical signal to one of the prism filters, and the optical emitting module emits a second optical signal comprising the second sub-optical signals to an exterior of the box-shaped housing via the prism filter module, the through hole and the optical fiber connector.

2. The butterfly-type packaged optical transceiver of claim 1, further comprising a filter module, wherein the filter module adjusts a direction of the second optical signal from the prism filter module to be aligned with the optical fiber connector.

3. The butterfly-type packaged optical transceiver of claim 2, wherein the filter module and the prism filter module are integrally formed.

4. The butterfly-type packaged optical transceiver of claim 2, wherein the filter module comprises a first filter and a second filter, and the first filter and the second filter are at an included angle of 45 degrees from the axis.

5. The butterfly-type packaged optical transceiver of claim 4, wherein the second optical signal is transmitted to the first filter by the prism filter module, the second optical signal is reflected toward the optical receiving module by the first filter, and further reflected to the through hole by the second filter to transmit to the optical fiber connector.

6. The butterfly-type packaged optical transceiver of claim 4, wherein the first optical signal passes through the second filter and then is transmitted to the prism filter module.

7. The butterfly-type packaged optical transceiver of claim 4, wherein an extension line formed by the first filter and the second filter is perpendicular to the axis.

8. The butterfly-type packaged optical transceiver of claim 1, wherein the first optical signal comprises a first predetermined number of the first sub-optical signals, the first sub-optical signals respectively have different wavelengths, the second optical signal comprises a second predetermined number of the second sub-optical signals, and the second sub-optical signals respectively have different wavelengths.

9. The butterfly-type packaged optical transceiver of claim 8, wherein the optical receiving module comprises an optical detection module, the optical detection module comprises the first predetermined number of the optical detectors respectively detecting the first sub-optical signal, the optical emitting module comprises a laser module, and the laser module comprises the second predetermined number of the laser diodes respectively emitting the second sub-optical signal.

10. A butterfly-type packaged optical transceiver comprising:

a box-shaped housing having a through hole;

a cover plate coupled with the box-shaped housing, and forming an internal space with the box-shaped housing;

an optical receiving module disposed in the internal space, and comprising a plurality of optical detectors;

an optical emitting module disposed in the internal space, and comprising a plurality of laser diodes;

a prism filter module disposed in the internal space and between the optical detectors and the laser diodes, and extending in an axis, wherein the prism filter module comprising a plurality of prism filters arranged along the axis, and each of the prism filters is between one of the optical detectors and one of the laser diodes in a direction perpendicular to the axis, wherein centers of the prism filter module and the through hole define an axis;

an optical fiber connector connected to the through hole; and a plurality of electrical connection elements respectively penetrating both side surfaces and electrically connected to the optical receiving module and the optical emitting module, wherein the side surfaces are adjoining a surface of the box-shaped housing contacting with the optical fiber connector, wherein a first optical signal comprising a plurality of sub-optical signals is transmitted to the prism filter module via the optical fiber connector and the through hole, and each of prism filters reflects one of the first sub-optical signal to one of the optical detectors, and wherein each of the laser diodes emits a second sub-optical signal to one of the prism filters, and the optical emitting module emits a second optical signal comprising the second sub-optical signals to an exterior of the box-shaped housing via the prism filter module, the through hole and the optical fiber connector.

11. The butterfly-type packaged optical transceiver of claim 10, wherein the optical module further comprises a filter module, the filter module adjusts a direction of the second optical signal from the prism filter module to be aligned with the optical fiber connector.

12. The butterfly-type packaged optical transceiver of claim 11, wherein the filter module comprises a first filter and a second filter, and the first filter and the second filter are at an included angle of 45 degrees from the axis.

13. The butterfly-type packaged optical transceiver of claim 12, wherein the second optical signal is transmitted to the first filter by the optical module, the second optical signal is reflected toward the optical receiving module by the first filter, and further reflected to the through hole by the second filter to transmit to the optical fiber connector.

14. The butterfly-type packaged optical transceiver of claim 12, wherein the first optical signal passes through the second filter and then is transmitted to the optical module.

15. The butterfly-type packaged optical transceiver of claim 12, wherein an extension line formed by the first filter and the second filter is perpendicular to the axis.

16. The butterfly-type packaged optical transceiver of claim 10, wherein the first optical signal comprises a first predetermined number of the first sub-optical signals, the first sub-optical signals respectively have different wavelengths, the second optical signal comprises a second predetermined number of the second sub-optical signals, and the second sub-optical signals respectively have different wavelengths.

17. The butterfly-type packaged optical transceiver of claim 16, wherein the optical receiving module comprises an optical detection module, the optical detection module comprises the first predetermined number of the optical detectors respectively detecting the first sub-optical signal, the optical emitting module comprises a laser module, and the laser module comprises the second predetermined number of the laser diodes respectively emitting the second sub-optical signal.

\* \* \* \* \*